(12) United States Patent
Akers et al.

(10) Patent No.: US 7,604,398 B1
(45) Date of Patent: Oct. 20, 2009

(54) REMOTE INDICATING CUMULATIVE THERMAL EXPOSURE MONITOR AND SYSTEM FOR READING SAME

(76) Inventors: Jeffrey W. Akers, 1411 Anthony St., Columbia, MO (US) 65201; Gerald A. Coles, 7101 Mazy La., Rowlett, TX (US) 75089; James Michael Zerkus, 606 Cedar La., Seabrook, TX (US) 77586

( * ) Notice: Subject to any disclaimer, the term of this patent is extended or adjusted under 35 U.S.C. 154(b) by 85 days.

(21) Appl. No.: 11/728,565

(22) Filed: Mar. 26, 2007

(51) Int. Cl.
  *G01K 3/00* (2006.01)
  *G01K 5/00* (2006.01)
  *G01K 1/02* (2006.01)

(52) U.S. Cl. ............... 374/102; 374/187; 374/195; 374/188; 374/205; 116/216; 116/221; 340/588

(58) Field of Classification Search .............. 374/102, 374/187, 195, 188, 205; 116/216, 221; 340/584, 340/588
See application file for complete search history.

(56) References Cited

U.S. PATENT DOCUMENTS

| | | | |
|---|---|---|---|
| 2,966,261 A | 12/1960 | Bradbury | |
| 3,483,752 A | 12/1969 | Rogen et al. | |
| 4,389,217 A | 6/1983 | Baughman et al. | |
| 4,448,147 A | 5/1984 | Dewaegheneire | |
| 4,578,992 A | 4/1986 | Galasko et al. | |
| 4,804,275 A | 2/1989 | Kang et al. | |
| 4,857,893 A | 8/1989 | Carroll | |
| 4,911,217 A | 3/1990 | Dunn et al. | |
| 5,018,874 A | 5/1991 | Weynant nee Girones | |
| 5,076,197 A | 12/1991 | Darringer et al. | |
| 5,335,994 A | 8/1994 | Weynant nee Girones | |
| 5,364,132 A | 11/1994 | Haas et al. | |
| 5,451,959 A | 9/1995 | Schuermann | |
| 5,531,180 A | 7/1996 | Bianchini | |
| 5,661,651 A | 8/1997 | Geschke et al. | |
| 5,712,609 A | 1/1998 | Mehregany et al. | |
| 5,735,607 A | 4/1998 | Shahinpoor et al. | |
| 6,160,084 A | 12/2000 | Langer et al. | |
| 6,388,043 B1 | 5/2002 | Langer et al. | |
| 6,425,343 B1 | 7/2002 | Akers et al. | |
| RE37,956 E | 1/2003 | Blama | |
| 6,509,094 B1 | 1/2003 | Shah et al. | |
| 6,596,102 B2 | 7/2003 | Homma | |
| 6,612,739 B2 | 9/2003 | Shahinpoor | |
| 6,614,728 B2 | 9/2003 | Spevacek | |
| 6,682,521 B2 | 1/2004 | Petrakis | |
| 6,720,402 B2 | 4/2004 | Langer et al. | |
| 6,746,552 B2 | 6/2004 | Homma | |

(Continued)

*Primary Examiner*—Lisa M Caputo
*Assistant Examiner*—Mirellys Jagan
(74) *Attorney, Agent, or Firm*—Kenneth A. Roddy (57) ABSTRACT

Cumulative thermal exposures monitors and remote indicating cumulative thermal exposure monitors and system for reading the same are disclosed. The monitors have a thermally insulative housing with a cavity and a thermally-responsive member therein formed of shape memory material, which may be provided with a coating or sheath of insulative or shape memory polymer material, that gradually changes from a first shape to a second shape over a prescribed temperature range wherein the thermal capacity and insulative properties of the housing, cavity, and shape memory material transition temperature range are correlated relative to one another and calibrated to closely match a thermal decay profile (time-temperature profile) of the product being monitored. In remote indicating embodiments, the data can be retrieved remotely via RF transponder technology without directly viewing the monitor device.

12 Claims, 5 Drawing Sheets

U.S. PATENT DOCUMENTS

| | | |
|---|---|---|
| 6,757,492 B1 | 6/2004 | Hall |
| 6,822,931 B2 | 11/2004 | Braunberger |
| 6,837,620 B2 | 1/2005 | Shahinpoor |
| 6,848,390 B2 | 2/2005 | Akers et al. |
| 6,946,040 B2 | 9/2005 | Homma |
| 7,048,730 B2 | 5/2006 | Petrakis |
| 7,057,495 B2 | 6/2006 | Debord et al. |
| 7,074,484 B2 | 7/2006 | Topolkaraev et al. |
| 2003/0188677 A1* | 10/2003 | Akers et al. ................. 116/216 |
| 2006/0207495 A1 | 9/2006 | Petrakis |
| 2006/0260534 A1 | 11/2006 | Petrakis |

* cited by examiner

Acceptable Food to Eat

Growth of Micro-organisms - - Temperature Controlled

REMOTE INDICATING CUMULATIVE THERMAL EXPOSURE MONITOR AND SYSTEM FOR READING SAME

BACKGROUND OF THE INVENTION

1. Field of the Invention

This invention relates generally to thermal exposure monitors, and more particularly to a cumulative thermal exposure monitor and system for reading the same. The time-temperature integrating monitor device has a thermally insulative housing with a cavity and a thermally-responsive member therein formed of shape memory material which may be coated with shape memory polymer that gradually changes from a first shape to a second shape over a prescribed temperature range wherein the thermal capacity and insulative properties of the housing, cavity, and shape memory material transition temperature range are correlated relative to one another and calibrated to closely match a thermal decay profile (time-temperature profile) of the product being monitored, and the data can be retrieved remotely via RF transponder technology without directly viewing the monitor device.

2. Background Art

It is of utmost importance to maintain processed produce such as food products and perishable non-food products such as medical products, drugs, research reagents, pharmaceuticals, human organs and tissues, etc., within a predetermined temperature range and to determine whether such products may have been exposed to detrimental temperatures outside of a specified temperature range during some step in the chain of distribution from the source to the destination.

The demand for processed produce and perishable non-food products has pushed the limits of the distribution systems of the perishable products industry to maintain an unbroken temperature controlled chain from field to consumer and industry. Many segments of the food industry utilize a Hazard Analysis and Critical Control Point system (HACCP), which is a world-recognized, common sense approach to food safety and prevention of food contamination.

The HACCP has outlined seven principles for food safety and prevention of food contamination: (1) Conduct a hazard analysis to identify potential hazards that could occur in the food production process; (2) Identify the critical control points (CCPs)—those points in the process where the potential hazards could occur and can be prevented and/or controlled; (3) Establish critical limits for preventive measures associated with each CCP; (4) Monitor each CCP to ensure it stays within the limits; (5) Take corrective actions when monitoring determines a CCP is not within the established limits; (6) Keep records that document the HACCP system is monitored and working correctly; and (7) Verify that the HACCP system is working properly through tests and other measures.

Existing HACCP programs in place at the processing end of the chain are not equipped with proper tools to monitor all of the critical control points (CCP's) in the cold chain, and temperature related problems can still occur throughout the distribution chain. Thus, there is a need for a device that can be used for economically monitoring the links in the cold chain, especially when perishable loads are broken up and re-distributed.

Temperature monitors and indicators are known in the art. There are several patents that disclose various temperature indicating devices.

Bradbury, U.S. Pat. No. 2,966,261 teaches a "snap-action" temperature-sensing device having a thermally responsive bimetallic inverted V-shaped spring (not shape memory alloy or polymer material), and a latch insertable into the device to temporarily hold the spring member in an initial position. The apex of the V-shaped spring serves as a pointer and indicia on the housing represent zones corresponding to the location of the apex to indicate the temperature of the monitored product.

Rogen et al U.S. Pat. No. 3,483,752 discloses a temperature monitor using a shape-memory alloy sensor disposed in a compartment in a housing preferably constructed of transparent acrylic plastic that has: (1) a thin wall section that is affixed onto the package of a medium being monitored to serve as a preferential heat conducting path between the monitored medium and the sensor is affixed onto the package of a medium being monitored, and (2) a thick wall section that serves as a preferential insulating path between the sensor and the ambient environment. The sensor must respond decisively (instantaneously) to a small temperature change and can be made to actuate (change shape) more rapidly than the monitored medium, to insure that the monitored medium (blood) is either safe or unsafe, but otherwise remains dormant. This device does not utilize a scale because there is no degree of spoilage of blood (it is either considered good or bad). It also requires the user to observe the configuration of the shape memory alloy sensor (whether it is straight or coiled, curled or flat, or twisted or flat) in order to determine whether the monitored medium has exceeded the specified temperature. This device differs from the present invention in that it is strictly a binary device (it can only give you a yes or no answer), it is designed to measure whether a temperature threshold has been exceeded, and its housing merely isolates the mechanism from its environment and links it to the medium.

Dewaegheneire, U.S. Pat. No. 4,448,147; Weynant nee Girones, U.S. Pat. No. 5,018,874; and Darringer et al, U.S. Pat. No. 5,076,197 disclose "step" type temperature monitors. These devices differ from the present invention in that they merely measure and indicate whether one or more temperature thresholds have been achieved.

Bianchini, U.S. Pat. No. 5,531,180 teaches a device utilizing a pre-loaded tension spring or leaf spring (not shape memory alloy or polymer) in cooperation with a fluid material having a controlled temperature dependent viscosity, wherein the viscosity changes as a function of temperature. The spring and fluid are located in a compartment in a transparent housing or case that is affixed onto the package of a medium being monitored. The end of the spring has an enlargement or indicator that is held in a first position by a removable retaining pin which is removed after the device along with the monitored medium has been frozen. As a result of the viscosity of the temperature dependent fluid or material, with the elapsing of time, the pressure of the spring will cause the indicator to move to a second position to indicate that the frozen product has gone through "thermal mishandling" in is unfit for consumption. The time required for the indicator to move to the second position is proportional to the viscosity and to the radius of the fluid friction surface (exterior surface of the spherical indicator) and inversely proportional to the elastic constant of the spring, which urges the indicator through the viscous medium. This device operates on different principles than the present invention and relies on the relationship of viscosity of a fluid with respect to temperature.

Shahinpoor et al, U.S. Pat. No. 5,735,607 discloses a temperature sensor having an indication surface, at least one shape memory alloy (SMA) member with a first shape at temperatures below a critical temperature and a second shape at temperatures above the critical temperature, and a plurality of indicators mounted with the members which obscure the indication surface when the members are in the first shape, and do not obscure the indication surface when the members are in their second shape. The shape change of the SMA element causes the sensor to change between two readily distinguishable states to indicate that a temperature threshold was exceeded, and must always be maintained at a temperature below the transformation temperature of the shape memory alloy member(s) until the beginning of the sensing operation.

Shahinpoor, U.S. Pat. No. 6,612,739 discloses a shape memory alloy temperature sensor having a sensing element with a portion made with a shape memory alloy mounted with a body fixedly at two ends. The fixed mounting at one end, is configured so that it can be converted to allow a moveable relationship between the body and the sensing element. While the mounting is fixed, the sensing element is prevented from indicating temperature deviations, and the apparatus can be stored and handled freely. After the mounting is converted to provide a moveable relationship, a temporary temperature excursion can cause the SMA portion to contract, providing a discernible change in the relationship between the sensing element and the body.

Shahinpoor, U.S. Pat. No. 6,837,620 discloses a shape memory alloy temperature sensor that provides a persistent indication that it has been exposed to temperatures below a certain critical temperature for a predetermined time period. An element of the sensor made from shape memory alloy changes shape when exposed, even temporarily, to temperatures below the Austenitic start temperature and well into Martensite finish temperature of the shape memory alloy. The shape change of the SMA element causes the sensor to change between two readily distinguishable states. The sensor includes a one-way stop element that creates a persistent indication of the temperature history, allowing the sensor to be manufactured and stored at temperatures above the Austenitic temperature without causing the indication of an over-temperature e Waynant nee Girones, U.S. Pat. No. 5,335,994 discloses a temperature monitoring device having a casing made of synthetic material that contains a motor element with it a movement transmission element consisting of a piston and rod and a shape memory alloy spring acting on at least one indicator element irreversibly to record each overstepping of a predetermined threshold temperature. The device is capable of having a variable response time ("delay time") on each of the temperature thresholds. One embodiment of the device enables the durations of the overstepping of the various temperature thresholds to be visually indicated.

Shah, et al, U.S. Pat. No. 6,509,094, discloses a polyimide coated shape memory material suitable for thermomechanical treatment to shape-set the material into the desired configuration and activate shape memory properties. The polyimide coating is subjected to a curing regime that imparts higher heat resistance in the polyimide coating to withstand the elevated temperatures required during the shape-setting treatment.

Transponder or transceiver type identification systems are also known in the art, and generally are capable of receiving an incoming interrogation signal and responding thereto by generating and transmitting an outgoing responsive signal. The outgoing responsive signal, in turn, is modulated or otherwise encoded so as to uniquely identify or label the particular object to which the transponder element is affixed.

Carroll, U.S. Pat. No. 4,857,893, discloses a transponder device that receives a carrier signal from an interrogator unit which is rectified by a rectifying circuit in order to generate operating power. Logic/timing circuits derive a clock signal and second carrier signal from the received carrier signal. This clock signal reads a unique identifying data word from a programmable read only memory (PROM). The data word is encoded and mixed with the carrier signal in a balanced modulator circuit. The output of the balanced modulator is transmitted to the interrogator unit where it is decoded and used as an identifying signal. The identifying signal identifies the particular transponder device from which it originated. The rectifier and balanced modulator circuits are realized from the same diode elements. All electrical circuits of the transponder device are realized on the same monolithic semiconductor chip, and in one embodiment, an antenna receiving/transmitting coil is also part of the chip, being placed around the periphery thereof.

Galasko, U.S. Pat. No. 4,578,992, discloses a tire pressure indicating device including a coil and a pressure-sensitive capacitor forming a passive oscillatory circuit having a natural resonant frequency which varies with tire pressure due to changes caused to the capacitance value of the capacitor. The circuit is energized by pulses supplied by a coil positioned outside the tire and secured to the vehicle, and the natural frequency of the passive oscillatory circuit is detected. The natural frequency of the coil/capacitor circuit is indicative of the pressure on the pressure-sensitive capacitor.

Dunn, et al, U.S. Pat. No. 4,911,217, which is hereby incorporated by reference herein in its entirety, discloses a RF transponder in a pneumatic tire. The transponder has two electrodes, a first of which is positioned such that the average spacing of the first electrode's surface from one of the tire's steel reinforcing components, such as an annular tensile member in its bead or a steel-reinforced ply, is substantially less than the average spacing of the second electrode's surface from the reinforcing component. This patent also describes an identification system ("reader") that can be used to interrogate and power the transponder within the tire. The identification system includes a portable hand-held module having within it an exciter and associated circuitry for indicating to a user the numerical identification of the tire/transponder in response to an interrogation signal.

Schuermann, U.S. Pat. No. 5,451,959, which is hereby incorporated by reference herein in its entirety, discloses another example of a RF transponder that can be installed in the carcass of a pneumatic vehicle tire. The transponder system includes an interrogation unit for communicating with a plurality of responder units. The responder unit contains a parallel resonant circuit having a coil and a capacitor for reception of a RF interrogation pulse. Connected to the parallel resonant circuit is a capacitor serving as an energy accumulator. A processor may be provided for receiving input signals from a sensor which responds to physical parameters in the environment of the responder unit, for example to the ambient temperature, the ambient pressure or the like. The sensor could for example be an air-pressure sensitive sensor. In this case the responder unit can be installed in the carcass of a vehicle pneumatic tire and, with the aid of the interrogation unit contained in the vehicle, the air pressure in the tire can be continuously monitored.

Geschke, et al, U.S. Pat. No. 5,661,651, which is hereby incorporated by reference herein in its entirety, discloses another example of a wireless RF transponder for installation in a pneumatic vehicle tire for monitoring vehicle parameters, such as tire pressure. RF signals transmitted from different tires may be distinguished based upon the frequency of the transmitted signal. In order to sense the pressure inside a tire, tire pressure monitoring systems utilize a pressure sensor located within the tire.

Mehregany, et al, U.S. Pat. No. 5,712,609, which is hereby incorporated by reference herein in its entirety, discloses a micromechanical memory sensor that serves as a mechanical memory latch or sensor, the activation of which is triggered by a change of conditions, e.g., temperature, acceleration and/or pressure. The device has a latch member that mechanically latches upon detection of a threshold value of a variable condition (e.g., temperature, acceleration and/or pressure) and circuitry for detecting such latching, and further includes a resetting mechanism for electrically unlatching the latch member whereby the sensor latched purely mechanically is electrically reset for repeat use. This device is an example of a sensor that senses and indicates that a transient threshold or extreme value (i.e., over-temperature or over-pressure condition) has occurred. The transponder transmits tire identification and tire pressure data in digitally-coded form, and is "passive" in that it is not self-powered, but rather obtains its operating power from an externally-provided RF signal. The tire in which it is installed has two spaced beads, each including an annular tensile member of wound or cabled steel wire. The transponder antenna is positioned adjacent one of the annular tensile members for electric or magnetic field coupling to the annular tensile member.

Blama, U.S. Pat. RE 37,956, discloses a method of and apparatus for identifying an item to or with which a radio frequency identification tag is attached or associated. The tag is made of a nonconductive material to have a flat surface on which a plurality of circuits are pressed, stamped, etched or otherwise positioned. Each circuit has a capacitance and an inductance. The capacitance is formed from the capacitive value of a single capacitor. The inductance is formed from the inductive value of a single inductor coil having two conductive ends each connected to the capacitor. Each tag is associated with a binary number established from a pattern of binary ones and zeros which depend on the resonance or non-resonance of each circuit, respectively, and the circuits position with respect to the binary table. The binary number may be converted to a decimal number using the binary table for conversion.

A "temperature sensitive" product does not decay or become spoiled as a result of exposure to a given temperature; instead, it spoils due to the amount of heat imparted to it as a result of a temperature difference over time. In other words, a given product, such as a food product or produce, can safely tolerate short exposures to an elevated temperature, but not long exposures. Thus, prior art devices that merely indicate that a temperature threshold was achieved or exceeded at some point in time do not indicate the cumulative amount of heat energy absorbed within a preferred storage temperature range and whether, at any time, the cumulative heat energy absorbed has taken place for a period of time sufficient to cause any degree of deterioration based on the time and temperature thermal deterioration profile of the perishable product.

The present invention utilizes some of the components and technology described in commonly-owned U.S. Pat. No. 6,425,343 and U.S. Pat. No. 6,848,390, which are hereby incorporated by reference in their entirety to the same extent as if fully set forth herein. The prior commonly-owned patents disclose cumulative thermal exposure monitors that have a thermally-conductive housing adapted to be placed in close proximity to a product to be monitored and at least one thermally-responsive shape memory alloy member in the housing that has a first shape at temperatures below a critical temperature and a second shape at temperatures above the critical temperature and a transformation temperature range encompassing a prescribed time-temperature profile which is determined by the detrimental temperature related to the product being monitored. An indicator associated with the thermally-responsive member is moved from an initial position as the thermally-responsive member changes from the first shape to the second shape so as to be visually observed through a window on the housing to visually indicate whether the product being monitored has been exposed to temperatures above the prescribed detrimental temperature for a period of time that would be detrimental to the product. The present invention incorporates significant improvements in structure and operation over the previous commonly-owned patents, and the data can be retrieved remotely via RF transponder technology without directly viewing the monitor device.

The present invention is distinguished over the prior art and these patents in particular by cumulative time-temperature integrating thermal exposure monitors for monitoring heat energy absorbed over time and indicating the degree of deterioration based on a time and temperature thermal deterioration profile of a perishable product that has a known time and temperature thermal deterioration profile and is prescribed to be maintained within a preferred storage temperature range. The devices have a thermally-conductive housing with a fluid sealed interior cavity and a transparent window portion, the housing formed of a material having thermal capacity and insulative properties which moderate heat energy conducted therethrough over time. A thermally-responsive member movably disposed in the interior cavity is formed of a shape memory material and has a phase transition temperature range encompassing at least the preferred storage temperature range and has a first shape at temperatures below the phase transition temperature range and gradually changes to a second shape at temperatures in and above the preferred storage temperature range. The thermally-responsive member may be provided with an insulative coating or sheathing made of shape memory polymer or conventional elastomers that allows for multi-shape recovery and greater response lag. Either the thermally-responsive member or an indicator associated therewith is moved through the window portion from an initial position as it gradually changes from its first shape to its second shape. The thermal capacity and insulative properties of the housing material, cavity fluid, and shape memory material phase transition temperature range are calibrated relative to one another to function in mutual cooperation such that the housing moderates heat energy conducted therethrough over time and the thermally-responsive member absorbs the heat energy and gradually assumes its second shape upon absorption of heat energy over time to closely match the known thermal deterioration profile of the perishable product. The thermally-responsive member or indicator remains substantially in a position at which it was last moved, regardless of subsequent exposures of the shape memory material to lower temperatures, to indicate the cumulative amount of heat energy absorbed within and above the preferred storage temperature range and whether, at any time, the temperature has been above the preferred temperature range for a period of time sufficient to cause any degree of deterioration based on the time and temperature thermal deterioration profile of the perishable product. In a remote indicating embodiment, radio frequency (RF) transponder technology is used to remotely retrieve cumulative thermal exposure and identification data whereby the data can be retrieved remotely without directly viewing the monitor device, or removing it from the product package, and thereby allow monitoring in situations where it is difficult or inconvenient to visually check each monitor.

SUMMARY OF THE INVENTION

It is therefore an object of the present invention to provide a time-temperature integrating cumulative thermal exposure monitor that is calibrated to respond to the absorption of thermal energy over time in manner that closely matches the time and temperature thermal deterioration profile of a particular perishable product being monitored.

It is another object of this invention to provide a cumulative thermal exposure monitor that monitors and indicates whether a product or container with which it is associated has absorbed an amount of heat energy within and above a preferred storage temperature range for a period of time that would be detrimental to the product.

Another object of this invention is to provide a cumulative thermal exposure monitor that can be used with perishable food products and non-food products such as medical products, drugs, research reagents, pharmaceuticals, human organs and tissues, product packaging, etc., to indicate whether, at any time in the chain of distribution from the source to the destination, the cumulative heat energy absorbed by such products has taken place for a period of time sufficient to cause a degree of deterioration based on the time and temperature thermal deterioration profile of the perishable product.

Another object of this invention is to provide a cumulative thermal exposure monitor that can be used with perishable food products that will accurately indicate the degree of spoilage or deterioration.

Another object of this invention is to provide a remote indicating cumulative thermal exposure monitor that utilizes radio frequency (RF) transponder technology to remotely retrieve cumulative thermal exposure and identification data whereby the data can be retrieved remotely without directly viewing the monitor device, or removing it from the product package, and thereby allow monitoring in situations where it is difficult or inconvenient to visually check each monitor.

Another object of this invention is to provide a cumulative thermal exposure monitor that can be sterilized by chemicals, ionizing radiation or heat.

Another object of this invention is to provide a cumulative thermal exposure monitor that has a latching means that allows it to be handled at elevated temperature and in a practical fashion before use.

Another object of this invention is to provide a cumulative thermal exposure monitor that can serve as an inexpensive, convenient and effective regulatory tool for HACCP programs and allow real time decisions to be made as to the safety or quality of a perishable product.

Another object of this invention is to provide a cumulative thermal exposure monitor that may reduce liability by indicating, package by package, whether the thermal history of a particular perishable product was within proper limits while it was in transit or storage.

Another object of this invention is to provide a cumulative thermal exposure monitor that closely mimics the time and temperature thermal deterioration profile of a perishable product and does not require attachment to the monitored product for its operation.

A further object of this invention is to provide a cumulative thermal exposure monitor that is food-safe and has little danger of contaminating the product it is monitoring.

A still further object of this invention is to provide a cumulative thermal exposure monitor that is inexpensive to manufacture, may be disposable, and is economical to install on individual containers.

Other objects of the invention will become apparent from time to time throughout the specification and claims as hereinafter related.

The above noted objects and other objects of the invention are accomplished by the present cumulative time-temperature integrating thermal exposure monitors that monitor heat energy absorbed over time and indicate the degree of deterioration based on a time and temperature thermal deterioration profile of a perishable product that has a known time and temperature thermal deterioration profile and is prescribed to be maintained within a preferred storage temperature range. The devices have a thermally-conductive housing with a fluid sealed interior cavity and a transparent window portion, the housing formed of a material having thermal capacity and insulative properties which moderate heat energy conducted therethrough over time. A thermally-responsive member movably disposed in the interior cavity is formed of a shape memory material and has a phase transition temperature range encompassing at least the preferred storage temperature range and has a first shape at temperatures below the phase transition temperature range and gradually changes to a second shape at temperatures in and above the preferred storage temperature range. The thermally-responsive member may be provided with an insulative coating or sheathing made of shape memory polymer or conventional elastomers that allows for multi-shape recovery and greater response lag. Either the thermally-responsive member or an indicator associated therewith is moved through the window portion from an initial position as it gradually changes from its first shape to its second shape. The thermal capacity and insulative properties of the housing material, cavity fluid, and shape memory material phase transition temperature range are calibrated relative to one another to function in mutual cooperation such that the housing moderates heat energy conducted therethrough over time and the thermally-responsive member absorbs the heat energy and gradually assumes its second shape upon absorption of heat energy over time to closely match the known thermal deterioration profile of the perishable product. The thermally-responsive member or indicator remains substantially in a position at which it was last moved, regardless of subsequent exposures of the shape memory material to lower temperatures, to indicate the cumulative amount of heat energy absorbed within and above the preferred storage temperature range and whether, at any time, the temperature has been above the preferred temperature range for a period of time sufficient to cause any degree of deterioration based on the time and temperature thermal deterioration profile of the perishable product. In a remote indicating embodiment, radio frequency (RF) transponder technology is used to remotely retrieve cumulative thermal exposure and identification data whereby the data can be retrieved remotely without directly viewing the monitor device, or removing it from the product package, and thereby allow monitoring in situations where it is difficult or inconvenient to visually check each monitor.

DESCRIPTION OF THE PREFERRED EMBODIMENTS

The cumulative thermal exposure monitors (CTEMs) and remote indicating thermal exposure monitors (RCTEMs) of the present invention utilize the unique phase transition properties (shape memory and superelasticity) of shape memory materials (SMM) such as "Shape Memory Alloys" (SMA) and "Shape Memory Polymers" (SMP). Shape memory alloys undergo a reversible phase transition in their crystal structure when heated from a low temperature form to a high temperature form. Upon heating or cooling, shape memory alloys do not completely undergo their phase transition at one particular temperature. Instead, the transition begins at one temperature (known as the start temperature) and is completed at another temperature (known as the finish temperature). Further, there is a difference in the transition temperatures upon heating from the first phase to the second phase (martensite to austenite for example in Ni—Ti) and cooling from the second phase to the first (austenite to martensite), resulting in a delay or "lag" in the transition. This difference is known as the transition temperature hysteresis. The transition temperature hysteresis can also be effected by alloying, cold working and heat treatment.

The terms used in the following discussion are meant to have the following meanings. The "austenitic start temperature" ($A_s$) is the temperature at which a shape memory alloy starts transforming to austenite upon heating. The "austenitic finish temperature" ($A_f$) is the temperature at which a shape memory alloy finishes transforming to austenite upon heating. "Austenite" is the higher temperature phase present in Ni—Ti, for example. The "martensitic start temperature" ($M_s$) is the temperature at which a shape memory alloy starts transforming to martensite upon cooling. The "martensitic finish temperature" ($M_f$) is the temperature at which a shape memory alloy finishes transforming to martensite upon cooling. "Martensite" is the more deformable, lower temperature phase present in Ni—Ti, for example. "Hysteresis" is the temperature difference between a phase transition upon heating and cooling. "Shape memory" is the ability of certain materials to return to a predetermined shape upon heating via a phase transition. "Superelasticity" is the springy, "elastic" behavior present in shape memory alloys, such as Ni—Ti, at temperatures just above the $A_f$ temperature. The superelasticity arises from the formation and reversion of stress-induced martensite. Phase transition temperatures of the metal alloys can be accurately set between, for example, −200° C. to 250° C. by varying the composition of the alloy and annealing procedure when forming the shape memory alloy wire.

Figure 1:
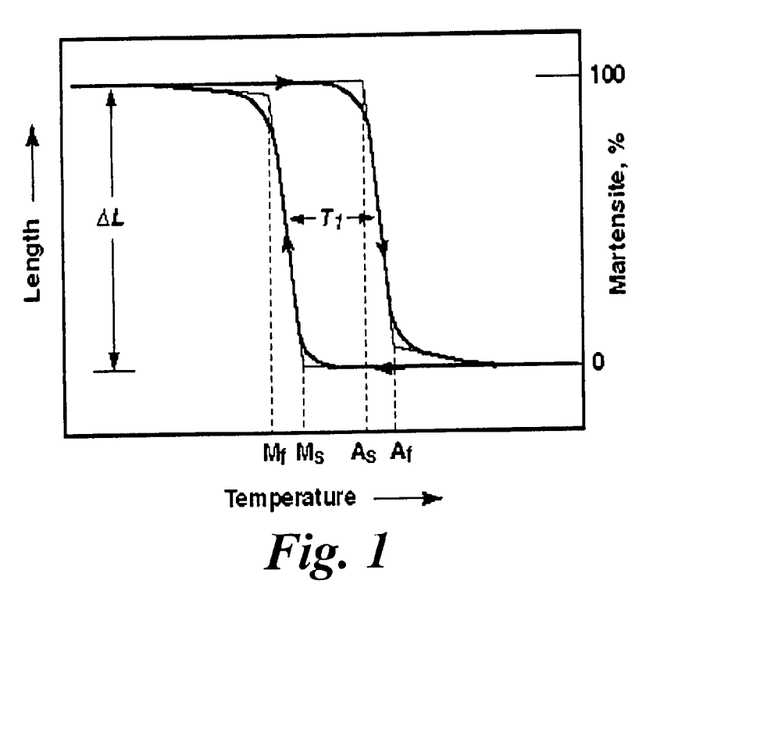
FIG. 1 is a graph illustrating the transformation characteristics versus temperature curve of a typical shape memory alloy and the nomenclature used to identify the major points in the cycle.

The graph of FIG. 1 illustrates the transformation characteristics versus temperature curve of a typical shape memory alloy and the nomenclature used to identify the major points in the cycle. Most of the transformation occurs over a narrow temperature range, although the beginning and end of the transformation during heating or cooling actually extends over a larger temperature range. The transformation also exhibits hysteresis in that the transformations on heating and on cooling do not overlap. This transformation hysteresis, shown as T1, varies with the alloy. The transformation temperature range and physical response curve may be tailored by changing the composition of the alloy, amount of cold work and or heat treatment.

"Shape Memory Polymer" (SMP) or polymer composites work similarly to existing shape memory alloys (SMA). The SMP material, commonly composed of oligo-dimethacrylate and n-butyl acrylate, undergoes a phase transition at a transition temperature range encompassing the glass transition temperature Tg, whereby heating the material above the temperature Tg enables the material to soften and be reshaped to another configuration, and cooling of the material below the temperature Tg causes the material to stiffen and retain the reshaped configuration until the material is reheated to above the temperature Tg causing the material to return to its original shape. SMPs are generally characterized as phase segregated linear block co-polymers having a hard segment and a soft segment. The hard segment is typically crystalline, with a defined melting point, and the soft segment is typically amorphous, with a defined glass transition temperature Tg. In some embodiments, however, the hard segment is amorphous and has a glass transition temperature rather than a melting point. In other embodiments, the soft segment is crystalline and has a melting point rather than a glass transition temperature. The melting point or glass transition temperature of the soft segment is substantially less than the melting point or glass transition temperature of the hard segment. Examples of polymers used to prepare hard and soft segments of SMPs include various polyethers, polyacrylates, polyamides, polysiloxanes, polyurethanes, polyether amides, polyurethane/ureas, polyether esters, and urethane/butadiene copolymers. Recently SMPs have been developed that a capable of holding more than one temporary shape in memory. For a more detailed description of shape memory polymers, the reader is referred to U.S. Pat. Nos. 6,160,084, 6,388,043 and 6,720,402 issued to Langer et al, which are hereby incorporated by reference to the same extent as if fully set forth herein.

Figure 2:
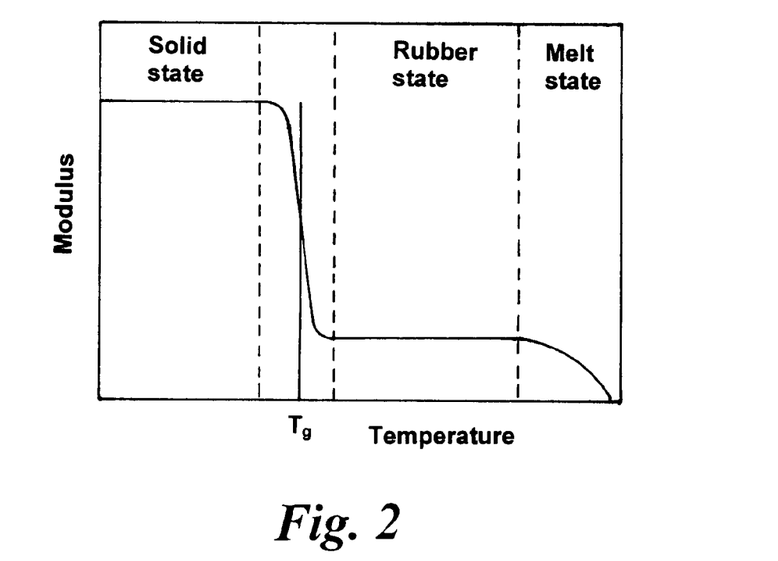
FIG. 2 is a graph illustrating the modulus versus temperature of a typical shape memory polymer.

Shape Memory Polymers (SMPs) have the ability to undergo reversible inelastic strains. The graph of FIG. 2 illustrates the modulus versus temperature of a typical shape memory polymer. The reversible inelastic strain capability is the basis of the shape memory effect. If the plastic is strained into a new shape at a high temperature (above the glass transition temperature, Tg) and then cooled it becomes fixed into the new shape. The initial shape can be recovered by reheating the polymer above its glass transition temperature Tg. By varying the amount of the comonomer in the polymer network, the cross-link density can be adjusted. In this way, the mechanical strength and transition temperature range of the polymers can be tailored over a wide range.

Suitable shape memory materials (SMM) include Ag—Cd, Au—Cd, Cu—Al—Ni, Cu—Sn, In—Ti, Ni—Al, Ni—Ti, Fe—Mn—Si, Cu—Zn—Al, Ni—Ti—Fe, Ni—Ti—Cu, Ni—Ti—Pd, Nb—Ru, Ta—Ru, Ti—Ni—Hf, Fe—Mn—Si, Cu—Zn—Si, Cu—Zn—Sn, Fe—Pt, Mn—Cu, polyurethanes, epoxies, oligo—dimethacrylate and n—butyl acrylate, Pb—La—Zr—Sn—Ti, Pb—Y—Zr—Sn—Ti—O, Pb—Ba—Zr—Ti—O and U—Nb.

As used herein, "product" is the thing or medium that is being monitored and may include food products, non-food products, medical products, drugs, research reagents, pharmaceuticals, human organs, tissues, or other substance or device that may be subject to deterioration upon exposure to thermal differences over time, or the product package. "Threshold temperature" is the temperature at which deterioration of a product begins or substantially increases based on a time and temperature thermal deterioration profile of that particular product. "Thermal capacity" is defined as the product of specific heat, volume and density of the housing and shape memory material. "Heat energy" is a function of time and temperature difference.

As used herein, the term "phase transition start temperature" means the temperature at which the shape memory material (SMM, e.g., SMA or SMP) is set to begin to change from its first shape. "Phase transition finish temperature" means the temperature at which the shape memory material is set to assume its second shape. "Phase transition temperature range" means the temperature range over which the shape memory material changes from its first shape to its second shape. "Preferred storage temperature range" is a known practical temperature range within which a product must be maintained to minimize deterioration. The shape memory "phase transition temperature range" would encompass at least the "preferred storage temperature range" of the product being monitored. The "time and temperature thermal deterioration profile" is the unique relationship between a product's deterioration and absorbed thermal energy as a result of time and temperature at temperatures inside and encompassing the product's "preferred storage temperature range".

In the following discussion, some of the structural components of the present invention are somewhat similar to features that are described in commonly-owned U.S. Pat. No. 6,425,343 and U.S. Pat. No. 6,848,390, which are hereby incorporated by reference in their entirety to the same extent as if fully set forth herein. This incorporation-by-reference is for the purpose of simplifying the drawings and descriptions of the present invention and, also for the purpose of providing a clear and concise description of this invention. The reader may refer to the above patents for a more detailed description of particular structural components of the cumulative thermal exposure monitors of the present invention. As described hereinafter, the present invention incorporates significant improvements in the structure and operation over the previous patent.

The previous commonly-owned patents (U.S. Pat. No. 6,425,343 and U.S. Pat. No. 6,848,390) disclose cumulative thermal exposure monitors for monitoring heat energy absorbed over time and indicating the degree of deterioration based on a time and temperature thermal deterioration profile of a perishable product that has a known time and temperature thermal deterioration profile and is prescribed to be maintained within a preferred storage temperature range. The devices have a thermally-conductive housing with a fluid sealed interior cavity and a transparent window portion, the housing formed of a material having thermal capacity and insulative properties which moderate heat energy conducted therethrough over time. A thermally-responsive member movably disposed in the interior cavity is formed of a shape memory material and has a phase transition temperature range encompassing at least the preferred storage temperature range and has a first shape at temperatures below the phase transition temperature range and gradually changes to a second shape at temperatures in and above the preferred storage temperature range. An indicator visible through the window portion is moved by the thermally responsive member from an initial position as it gradually changes from its first shape to its second shape. The thermal capacity and insulative properties of the housing material and shape memory material phase transition temperature range are calibrated relative to one another to function in mutual cooperation such that the housing moderates heat energy conducted therethrough over time and the thermally-responsive member absorbs the heat energy and gradually assumes its second shape upon absorption of heat energy over time to closely match the known thermal deterioration profile of the perishable product. The indicator remains substantially in a position at which it was last moved by the thermally-responsive member, regardless of subsequent exposures of the shape memory material to lower temperatures, to indicate the cumulative amount of heat energy absorbed within and above the preferred storage temperature range and whether, at any time, the temperature has been above the preferred temperature range for a period of time sufficient to cause any degree of deterioration based on the time and temperature thermal deterioration profile of the perishable product.

The time-temperature integrating cumulative thermal exposure monitors (CTEMs) of the present invention differ from the devices shown and described in the previous commonly-owned patents (U.S. Pat. No. 6,425,343 and U.S. Pat. No. 6,848,390) in that the thermally-responsive member movably disposed in the interior cavity may be provided with an insulative coating or sheathing made of shape memory polymer or conventional elastomers that allows for multi-shape recovery and greater response lag (due to better insulation). The "remote indicating" cumulative thermal exposure monitors (RCTEMs) of the present invention differ from the devices shown and described in the previous commonly-owned patents (U.S. Pat. No. 6,425,343 and U.S. Pat. No. 6,848,390) in that they utilize radio frequency (RF) transponder technology as a means to remotely retrieve cumulative thermal exposure and identification data. Thus, the data can be retrieved remotely without directly viewing the monitor device, or removing it from the product package, and thereby allow monitoring in situations where it is difficult or inconvenient to visually check each monitor.

Figure 3:
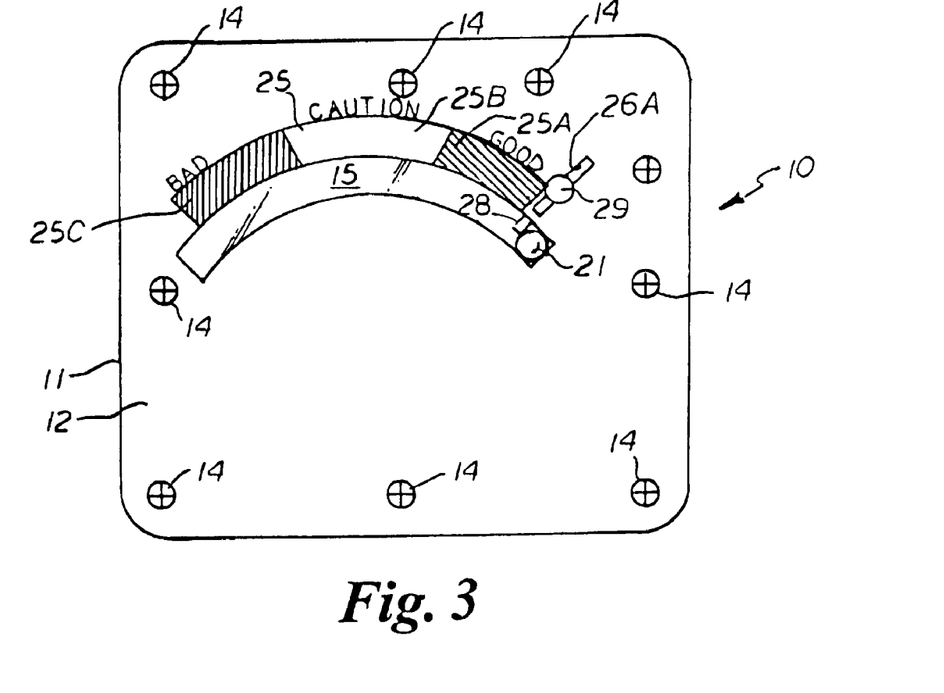
FIG. 3 is an enlarged front view of the face of a typical cumulative thermal exposure monitor in accordance with the present invention having a latch pin arrangement.
Figure 4:
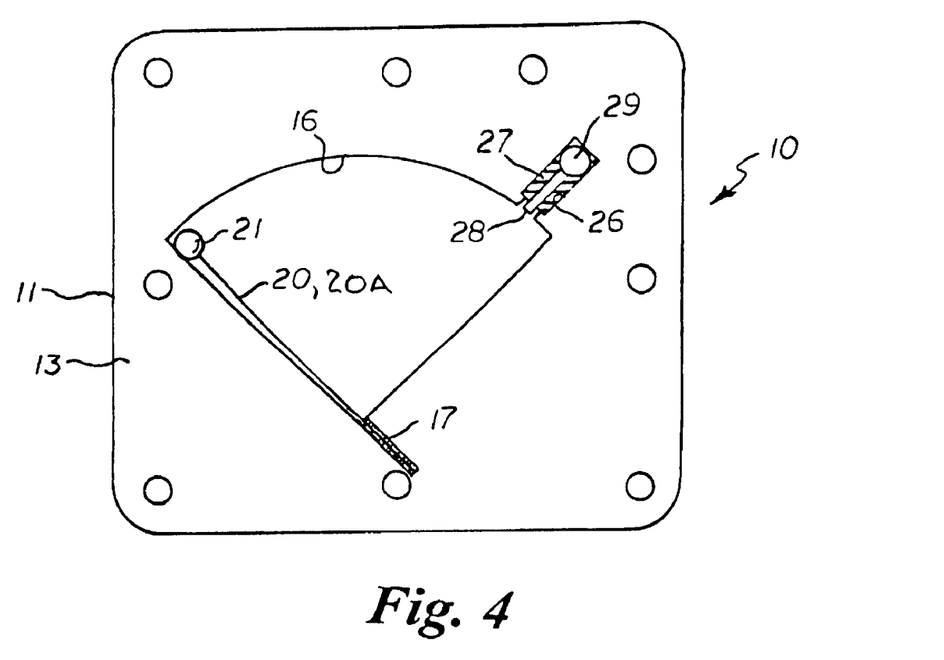
FIG. 4 is an enlarged front view of the embodiment of FIG. 3 with the faceplate removed and the latch pin retracted.

Referring now to the drawings by numerals of reference, there is shown in FIGS. 3 and 4, a preferred single-use, non-resettable or disposable embodiment of the cumulative thermal exposure monitor 10 in accordance with the present invention. The monitor 10 has a generally rectangular outer housing 11 which, in a preferred embodiment, is formed of a faceplate 12 and a back plate 13 secured together such as by screws 14, adhesives, or other conventional fastening means. The faceplate 12 and back plate 13 are formed of a rigid plastic or composite material that moderates heat conduction and, preferably, is capable of being sterilized by chemicals, heat or ionizing radiation. The faceplate 12 has a clear arcuate window portion 15. Although the housing is shown for purposes of illustration as being rectangular, it should be understood that the housing may be circular or various other configurations.

The front surface of the back plate 13 has a pie-shaped recess or cavity 16 with a small slot 17 extending a short distance outwardly from the apex of the pie-shape. A stiff thin rectangular strip or wire of shape memory alloy (SMA) or shape memory polymer (SMP) material 20 having a straight remembered configuration has one end secured in the slot 17 at the apex of the pie-shaped cavity 16 and may or may not have an enlarged colored indicator or marker 21, such as a bead, at its opposed free end. A straight slot 26 formed in the back plate 13 extends a short distance angularly outwardly from the curved portion of the pie-shaped cavity 16 toward a corner of the back plate. A synthetic rubber or elastomeric seal 27 having a central bore is disposed in the lower end of the slot 26.

One end of a thin stiff latch pin 28 extends through the bore of the seal 27 and its opposed end has a small bead or protuberance 29 that extends upwardly through a narrow rectangular aperture 26A in the faceplate 12 for sliding the pin 28 in and out relative to the pie-shaped cavity 16. In the inactive position, the free end of the shape memory strip or wire 20 is biased toward one side of the pie-shaped cavity 16 and the inner facing end of the latch pin 28 extends downwardly into the pie-shaped cavity to engage the free end of the shape memory member 20 (or marker 21) to hold it in its curved biased position.

Figure 5:
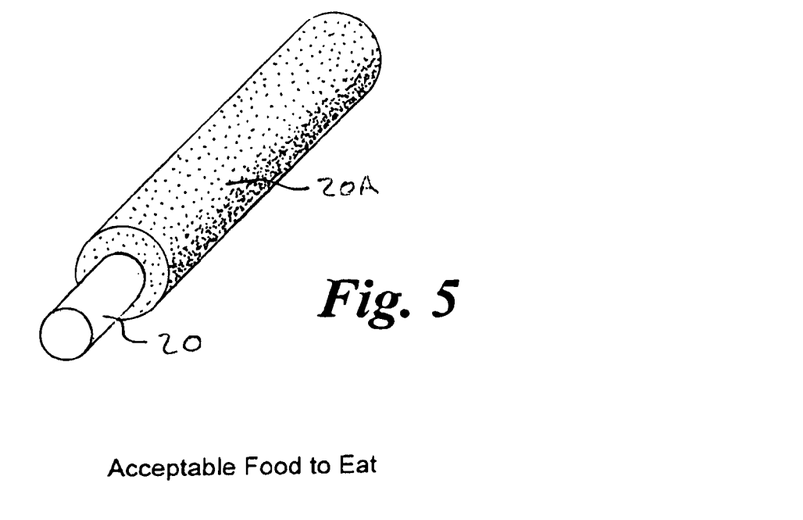
FIG. 5 is an enlarged isometric view of a thermally-responsive shape memory strip or wire having a flexible coating or sheathing formed of an insulating material or polymer that moderates the influx of heat energy into the thermally-responsive member.

As shown in FIG. 5, the thermally-responsive shape memory strip or wire 20 may be provided with a flexible coating or sheathing 20A, formed of an insulating material or polymer that moderates the influx of heat energy into the thermally-responsive member. In addition, the shape memory polymer coating or sheathing 20A makes it possible for the thermally-responsive member 20 to have multiple remembered shapes and transition temperature ranges rather than just one or two.

With the shape memory strip or wire 20 in the inactive latched position, the pie-shaped cavity 16 is filled with a fluid such as propylene glycol or a gas, or the gas is partially removed to create a partial vacuum, and the faceplate 12 and back plate 13 are sealed together to provide a fluid tight unit.

The material(s), thickness and thermally insulative properties of the outer housing plates 12 and 13, the cavity fluid or vacuum, the thermally-responsive member 20, and the shape memory polymer coating or sheathing 20A are selected to provide a desired thermal capacity (the product of specific heat, volume and density) and the shape memory material phase transition temperature range are calibrated relative to one another to function in mutual cooperation such that the housing moderates heat energy conducted therethrough over time and the thermally-responsive member absorbs the heat energy and gradually assumes its second shape upon absorption of heat energy over time to closely match or mimic the time and temperature thermal deterioration profile (described hereinafter) of the perishable product for which the device is to be used. To activate the device, the pin 28 is retracted to allow the shape memory strip or wire 20 to change from its initial shape to its remembered straight shape upon absorbing heat while in its phase transition temperature range.

A scale 25 is disposed on the front surface of the faceplate 12 above the arcuate window 15. The scale 25 is provided with calibrations 25A, 25B, 25C that relate the deflection of the shape memory strip or wire 20, or the position of the marker 21, to the degree of spoilage or deterioration of the particular product being monitored. Cumulative thermal exposure monitors may be provided in a wide variety of models to monitor different perishable products. Because the present cumulative thermal exposure monitors closely match or "mimic" the time and temperature thermal deterioration profile (described hereinafter) of the perishable product for which the device is to be used, it is not necessary to attach them to the product, however, an adhesive material (not shown) may be applied to the back surface of the back plate 13 of the outer housing 11 for attaching the housing to a product or food packaging material.

Figure 6:
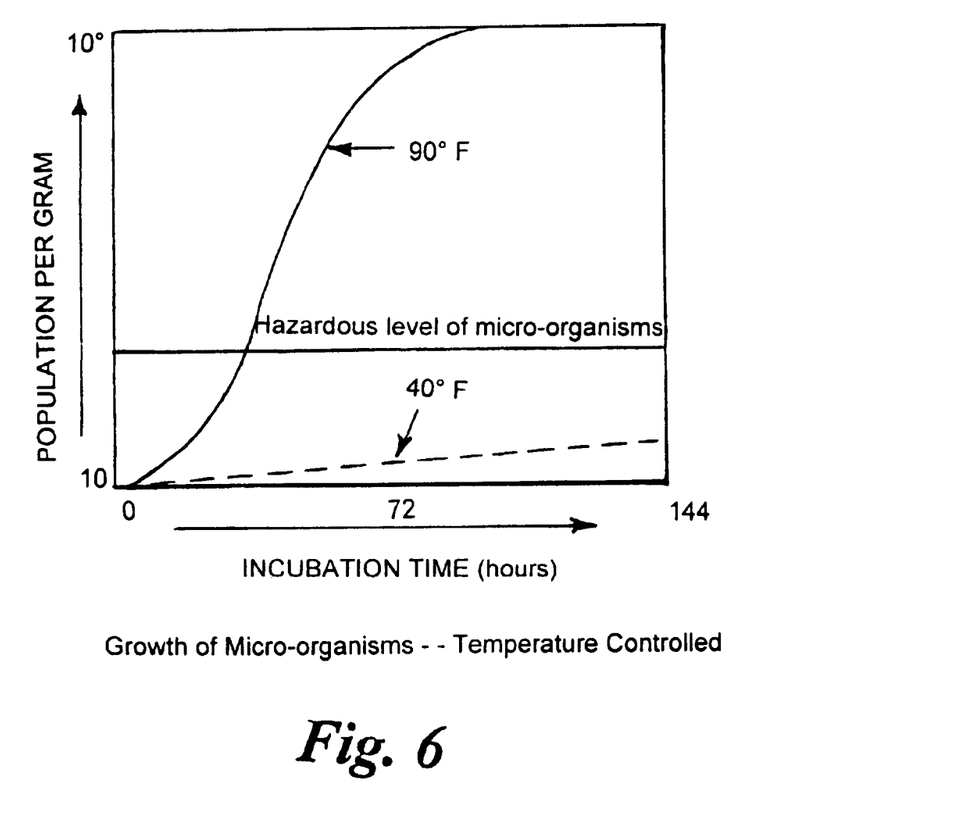
FIG. 6 is a chart illustrating a time-temperature-deterioration curve that may be used to design cumulative thermal exposure monitors having predetermined thermodynamic responses.

To achieve the desired thermodynamic properties, "time and temperature thermal deterioration curves" such as shown in FIG. 6 may be used to develop a time and temperature thermal deterioration profile based on historical data on the extent or degree of deterioration with respect to time and temperature for the particular product for which the device is to be used. In the example of FIG. 6, the deterioration due to microbial growth caused by prolonged exposure to elevated temperature is shown. The thermal capacity and thermal insulative properties of the housing, the phase transition temperature range of the shape memory member, and the cavity fluid, can be calibrated to function in mutual cooperation with each other to closely respond in accordance with the curve to measure the total heat energy absorbed above the threshold temperature (temperature at which deterioration of the particular product begins or significantly increases). Regardless of how many times the cumulative thermal exposure monitor may have been put into and taken out of a freezer, the indicator would show the cumulative heat energy absorbed at temperatures above the threshold temperature.

HACCP guidelines from the United States government Food and Drug Administration as well as other agencies of the US government and agencies of other governments may be used to develop the thermal decay profiles or time and temperature thermal deterioration profiles for the cumulative thermal exposure monitors. Other sources may be used as is appropriate for the type of product, medium, drug, or other substance or device to be monitored.

As an example, a monitor can be made for monitoring a food product wherein the meat is stored at a warehouse at −20° F., is shipped in a truck that is supposed to be maintained at 0° F., and must never be exposed to temperatures above 40° F. for more than a total of 4 hours prior to cooking and consumption. Thus, the prescribed preferred storage temperature range for the product would be from −20° F. to 40° F. and the prescribed time period would be 4 hours. The thermal capacity and insulative properties of the housing, the cavity fluid, and the phase transition temperature range of the shape memory member would calibrated to function in mutual cooperation with each other such that the shape member has a first shape at temperatures below −20° F. and gradually changes to its second shape upon absorption of heat exceeding 40° F. for 4 hours.

The thermally-responsive shape memory member 20 with the marker 21 on its outer end will deflect from "GOOD" (25A) to "BAD" (25C) at a rate dependent upon the total heat energy that is absorbed into the device. In the event that the temperature should drop below the phase transition temperature range while the device was responding, the shape memory member 20 or marker 21 would remain in the position it last attained.

When the shape memory member 20 and/or marker 21 is in the "GOOD" section (25A), it indicates that the temperature is and, since the device was activated, has been within the acceptable limits (below 40° F. in the example); when the marker is in the "CAUTION" section (25B), it indicates that the threshold temperature (40° F.) has been exceeded, but not for a sufficient period of time that would be detrimental; and when it is in the "BAD" section (25C), it indicates that the temperature has exceeded the threshold temperature (40° F.) for a sufficient amount of time to cause a significant degree of deterioration.

Thus, upon arrival or departure at an inspection point in the distribution chain, one could quickly and easily determine whether the food or product is presently, or has previously been, exposed to temperatures exceeding the threshold temperature and/or for a sufficient amount of time to cause significant deterioration of the product.

Figure 7:
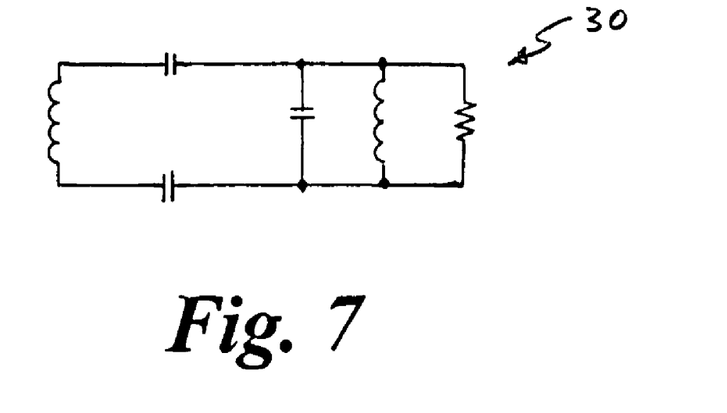
FIGS. 7 and 8 are schematic illustrations of the radio frequency (RF) circuit and structure of the remote indicating cumulative thermal exposure monitors of the present invention.
Figure 8:
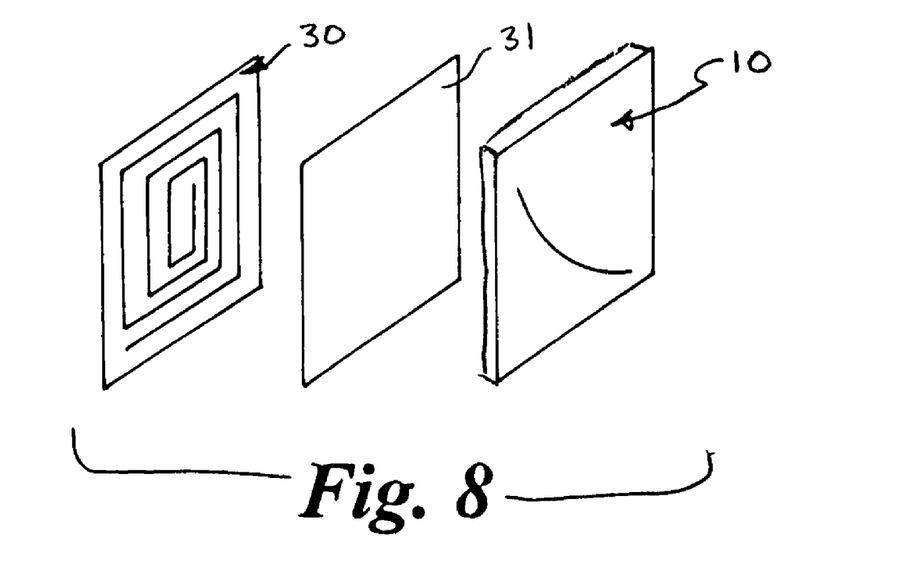

Referring now to FIGS. 7 and 8, the "remote indicating" cumulative thermal exposure monitors (RCTEMs) of the present invention utilize radio frequency (RF) transponder technology as a means to remotely retrieve cumulative thermal exposure and identification data. In this embodiment, the thermally-responsive shape memory strip or wire 20 of the cumulative thermal exposure monitor 10 is electrically conductive. A suitable radio frequency (RF) resonant structure comprises an inductor-capacitor-resistor (RLC) circuit or coil 30 as shown schematically in FIGS. 7 and 8, is constructed on a flexible material sheet and is then laminated to a thin insulating sheet 31. This assembly is then laminated to the cumulative thermal exposure monitor 10 (represented schematically). By capacitively coupling one end of the electrically conductive thermally-responsive shape memory strip or wire 20 and allowing the other end of the thermally-responsive member to move over the coil surface as a change in absorbed heat is registered, the resonant frequency can be made to vary in proportion to the change in heat absorbed. This resonant frequency is then determined by external stimulation.

Figure 9:
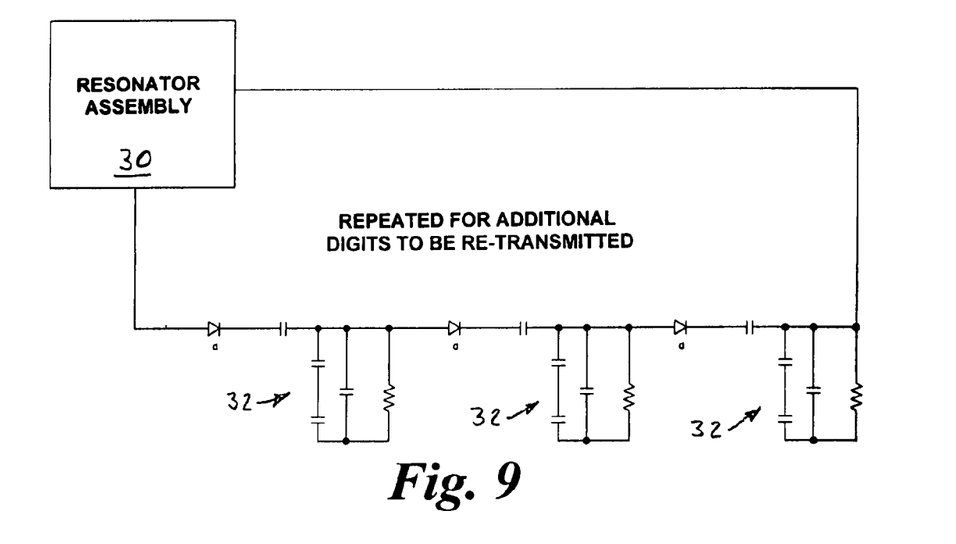
FIG. 9 is an electrical schematic of a modification or extension of the radio frequency (RF) resonant structure wherein the output of the circuit is coupled to a series of diode-resistor-capacitor circuits.

FIG. 9 shows schematically, a modification or extension of the radio frequency (RF) resonant structure wherein the output of the above circuit 30 (FIG. 7) is coupled to a series of diode-resistor-capacitor circuits 32 that rectify some of the energy received and retransmit a series of decaying pulses. The decay times of the pulses produced can be varied by selecting different combinations of capacitors. These capacitors are selected by either printing shorting bars with conductive ink or cutting shorting bars placed across them on a printed circuit board. Using this technique, an identifying code can be pre-programmed into each assembly. These simple electrical circuits are well known to those skilled in the art and therefore the circuitry and components are nor described in detail.

Figure 10A:
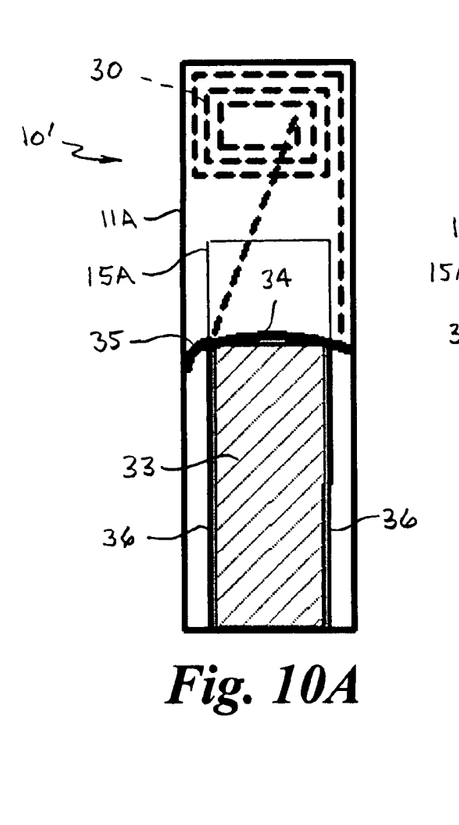
FIGS. 10A and 10B are schematic illustrations of an embodiment of the remote indicating cumulative thermal exposure monitor that utilizes shape memory polymer foam as the thermally-responsive member.
Figure 10B:
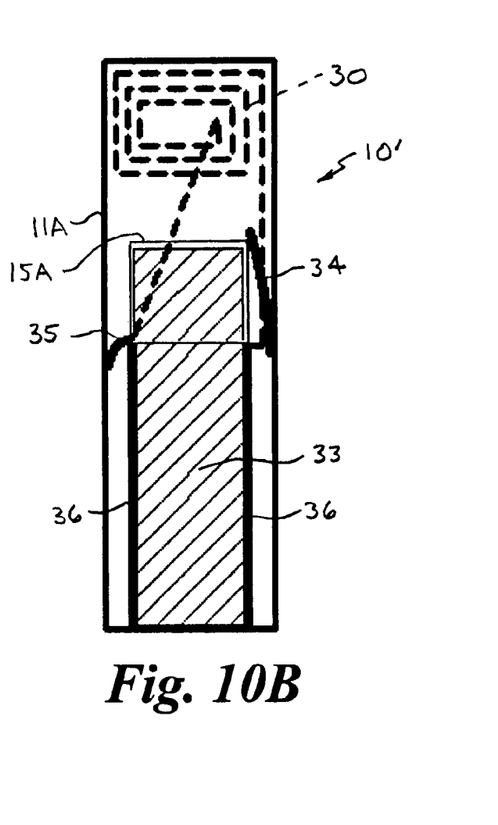

FIGS. 10A and 10B show, schematically, another embodiment of the "remote indicating" cumulative thermal exposure monitor (RCTEM) 10' utilizing shape memory polymer foam 33. The dashed lines represent electrically conductive pathways (metal, conductive ink and/or conductive polymers) that are on the back of the housing or hidden from view. The housing 11A is provided with a window 15A by which an observer may see the extent to which the shape memory polymer (SMP) foam 33 has reverted to its original form (a scale may be placed on the window to gauge the position of the SMP foam). In this example, the device is provided with a restraining member 34 that is formed of shape memory material having one-way memory (a concave remembered shape as seen in FIG. 10A) that restrains the SMP foam 33 when the device is unarmed. The restraining member 34 has an austenitic start temperature below the glass transition temperature of the SMP foam. FIG. 10A shows the shape memory polymer foam 33 in its low temperature state or unarmed restrained state, and FIG. 10B shows it in its high temperature original or deformed state. The device is provided with a latching element 35 formed of shape memory alloy that latches, by engagement, the restraining member 34 when the device is unarmed. The latching element 35 has a two-way memory; a curved shape (high temperature) and a straight (low temperature) shape. Its austenitic start temperature is higher than that of the restraining member 34. The housing 11A is provided with parallel electrically conductive plates 36 on opposed sides of the SMP foam 33, and there is no electrical contact between the shape memory alloy elements 34, 35, and the electrical conductors 36.

Alternatively, the remote indicating cumulative thermal exposure monitors may have the latch means modify the RF output such that the proper activation of the latch could be detected remotely. Also other arming methods for restraining the SMP foam when the device is not in use may be used, such as a pull pin.

These devices would be armed while affixed to products or by itself by placing them in an environment well below the austenitic start temperature of the latching element 35 that latches, by engagement, the restraining member 34. As the latching element 35 cools below its austenitic start temperature it straightens out and disengages from the restraining element 34, which is still above its austenitic start temperature. As a result, the restraining member 34 starts to return to its remembered shape (high temperature shape; as seen in FIG. 10B). Since the restraining member 34 then no longer restrains the SMP foam 33, the foam is free to expand into the void above the electrically conductive plates 36 when it is above its glass transition temperature. This expansion reduces the density of the foam 33 between the electrically conductive plates 36 and thereby causes a significant and predictable difference in capacitance. This difference in capacitance alters the nature of the transmitted response of the antenna capacitor combination when irradiated by an appropriate radio frequency. This change in response is used to determine the degree of recovery of the shape memory polymer and, as a result, the cumulative thermal exposure.

Interrogator

The remote indicating cumulative thermal exposure monitors (RCTEMs) may utilize a hand-held portable or a fixed station reader or interrogator that stimulates and receives a reply from the radio frequency (RF) circuit (tag) and records this information for later analysis or transcription. The interrogator can stimulate the remote indicating cumulative thermal exposure monitors (RCTEMs) as they are placed in close proximity (the distance depends on the application) in either individual units or as a group.

Interrogation Methods

Various conventional methods of interrogation which utilize non-ionizing electromagnetic radiation (radio waves) to stimulate and receive a reply from the remote indicating cumulative thermal exposure monitors (RCTEMs) are suitable for use. One preferred method is to use a swept or stepped carrier frequency modulated by a series of pulses. The variation in the frequency re-radiated or returned, as well as the presence, absence or modification of the pulse train may be used to convey information about the state of the remote indicating cumulative thermal exposure monitor(s) and the identification of an individual unit.

Another preferred method is to modify the method just described by selecting a unique code with a high degree of auto-correlation and a low degree of cross-correlation to uniquely identify a series of (lot coded) units as well as state information.

Additionally, when a large lot of containers containing several or many individual remote indicating cumulative thermal exposure monitors (RCTEMs) to be assessed, another method can be used to help isolate and interrogate the individual units en masse. In this modification, the reader or interrogator is divided into a transmitter and multiple receivers or antenna receiver combinations that are positioned to receive the replies from the stimulated units from different angles. Information from several sources can be compared and used to reinforce weak signals or reject redundant or erroneous replies. When used in conjunction with the above methods, a power signal processing technique is derived.

Operation

The following scenario illustrates an example of how the remote indicating cumulative thermal exposure monitors (RCTEMs) may be used.

A seafood wholesaler ships large volumes of white fish via an independent trucking company. The fish is packaged in boxes each weighing 20 pounds. A typical shipment consists of 50 boxes (1000 lbs). The shipments are typically from the warehouse to a restaurant or supermarket. The restaurants are busy, and the delivery truck has to deliver to several restaurants. The boxes of fish are sometimes left on the loading dock for a time until the restaurant employees have time to rearrange the freezer and put the fish away.

Obviously, the boxes of fish sitting on the loading dock of the restaurant are exposed to ambient temperature. If allowed to sit on the loading dock for a significant period of time the fish would spoil. However, a short stay on the loading dock does not endanger the freshness of the fish.

A remote indicating cumulative thermal exposure monitor (RCTEM) would be attached to each box of fish before it is initially cooled down at the wholesaler's warehouse or on the boat. At the time the fish is prepared for shipment the RCTEM would be armed automatically or manually. The RCTEM provides a way to be certain that, during the entire transport/storage process the fish was never subjected to detrimental prolonged elevated temperature at any point along the way. At any point in the process, the thermal exposure status can be checked by a worker that opens the box and looks at the visual display on the device, or more conveniently, the thermal exposure status can be checked remotely by a worker with a RF reader which does not require opening of the box or physical inspection of the monitor. In the event that, during transport or storage, the fish was exposed to a temperature above the selected threshold temperature; and held above that temperature for a period long enough to cause significant deterioration, the indicator in the RCTEM would be shifted corresponding to that degree of deterioration. On receipt, an inspector or worker visually or remotely with a RF reader could determine (at a glance) if conditions existed where a dangerous degree of spoilage may have occurred.

While this invention has been described fully and completely with special emphasis upon preferred embodiments, it should be understood that within the scope of the appended claims the invention may be practiced otherwise than as specifically described herein.

The invention claimed is:

1. A remote indicating time-temperature integrating cumulative thermal exposure monitor for monitoring heat energy absorbed over time and indicating the degree of deterioration based on a time and temperature thermal deterioration profile of a perishable product that has a known time and temperature thermal deterioration profile and is prescribed to be maintained within a preferred storage temperature range, comprising:

a thermally-conductive housing having a fluid sealed interior cavity, said housing formed of a material having thermal capacity and insulative properties which moderate heat energy conducted therethrough over time;

an electrically conductive thermally-responsive member movably disposed in said interior cavity formed of a shape memory material selected from the group consisting of shape memory alloys, shape memory polymer composites, and shape memory materials coated or sheathed with insulating material or polymers that moderate the influx of heat energy into said thermally-responsive member, said thermally-responsive member having a phase transition temperature range encompassing at least the preferred storage temperature range and having a first shape at temperatures below said phase transition temperature range and gradually changing to a second shape at temperatures within or above the preferred storage temperature range;

a radio frequency (RF) resonant circuit associated with said housing operatively coupled with said electrically conductive thermally-responsive member;

said thermal capacity and insulative properties of said housing material and said shape memory material phase transition temperature range calibrated relative to one another to function in mutual cooperation such that said housing moderates heat energy conducted therethrough over time and said thermally-responsive member absorbs the heat energy and gradually assumes its said second shape upon absorption of heat energy over time to closely match the known time and temperature thermal deterioration profile of the perishable product;

said electrically conductive thermally responsive member moves relative to said resonant circuit as it changes from its said first shape to said second shape and remains substantially in a position at which it was last moved, regardless of subsequent exposures of said shape memory material to lower temperatures; and a resonant frequency is induced in said resonant circuit in proportion to the change in heat absorbed by said thermally-responsive member to indicate the cumulative amount of heat energy absorbed in and above said preferred storage temperature range and whether, at any time, the temperature has been above said preferred storage temperature range for a period of time sufficient to cause any degree of deterioration based on the time and temperature thermal deterioration profile of the perishable product.

2. The remote indicating thermal exposure monitor according to claim 1, wherein said radio frequency (RF) resonant circuit is capacitively coupled with said electrically conductive thermally-responsive member.

3. The remote indicating thermal exposure monitor according to claim 1, wherein:

said thermally-responsive member is formed of shape memory polymer or polymer composite foam having a phase transition temperature range encompassing at least the preferred storage temperature range and having a first shape at temperatures below said phase transition temperature range and gradually changing to a second shape at temperatures within or above the preferred storage temperature range; and said foam is reduced in density as it changes its said second shape sufficient to induce a resonant frequency in said resonant circuit in proportion to the change in heat absorbed by said foam to indicate the cumulative amount of heat energy absorbed in and above said preferred storage temperature range and whether, at any time, the temperature has been above said preferred storage temperature range for a period of time sufficient to cause any degree of deterioration based on the time and temperature thermal deterioration profile of the perishable product.

4. The remote indicating thermal exposure monitor according to claim 1, wherein
   said thermally-conductive housing has a transparent window portion; and
   said thermally responsive member is visible through said window portion as it changes from its said first shape to said second shape.

5. The remote indicating thermal exposure monitor according to claim 4, further comprising:
   indicator means visible through said window portion and associated with said thermally-responsive member to be moved from an initial position thereby as said thermally-responsive member gradually changes from said first shape to said second shape; wherein
   said indicator means remains substantially in a position at which it was last moved by said thermally-responsive member, regardless of subsequent exposures of said shape memory material to lower temperatures, to indicate the cumulative amount of heat energy absorbed in and above said preferred storage temperature range and whether, at any time, the temperature has been above said preferred storage temperature range for a period of time sufficient to cause any degree of deterioration based on the time and temperature thermal deterioration profile of the perishable product.

6. The remote indicating thermal exposure monitor according to claim 1, wherein
   said radio frequency (RF) resonant circuit is a transponder that transmits data representing the cumulative amount of heat energy absorbed in and above said preferred storage temperature range and whether, at any time, the temperature has been above said preferred storage temperature range for a period of time sufficient to cause any degree of deterioration based on the time and temperature thermal deterioration profile of the perishable product.

7. The remote indicating thermal exposure monitor according to claim 6, wherein
   said radio frequency (RF) resonant circuit includes an output coupled with at least one diode-resistor-capacitor circuit that rectifies a portion of energy received and transmits or retransmits a series of decaying pulses having variable decay times to produce an identifying code.

8. The remote indicating thermal exposure monitor according to claim 6, further comprising:
   radio frequency (RF) reader/interrogator means that stimulates and receives a reply from said radio frequency (RF) circuit and records or displays said data.

9. The remote indicating thermal exposure monitor according to claim 8, wherein
   said radio frequency (RF) reader/interrogator utilizes non-ionizing electromagnetic radiation to stimulate and receive said data from said cumulative thermal exposure monitor.

10. The remote indicating thermal exposure monitor according to claim 9, wherein
    said radio frequency (RF) reader/interrogator has a transmitter and multiple receivers or antenna receiver combinations that are positioned to receive data from stimulated thermal exposure monitor units from different angles, whereby data from several monitors can be compared and used to reinforce weak signals or reject redundant or erroneous transmissions in a power signal processing technique.

11. The remote indicating thermal exposure monitor according to claim 9, wherein
    said radio frequency (RF) reader/interrogator utilizes non-ionizing electromagnetic radiation in a swept or stepped carrier frequency modulated by a series of pulses wherein the variation in the frequency re-radiated or returned and the presence or absence or modification of the pulse train is used to convey said data, and data representing the identification of a respective said thermal exposure monitor.

12. The remote indicating thermal exposure monitor according to claim 11, wherein
    said radio frequency (RF) reader/interrogator utilizes a unique code with a high degree of auto-correlation and a low degree of cross-correlation to uniquely identify a series of said thermal exposure monitors.

* * * * *